United States Patent [19]

Böhle et al.

[11] Patent Number: 4,788,113
[45] Date of Patent: Nov. 29, 1988

[54] SHEET MATERIAL AND SEPARATOR ENVELOPES MANUFACTURED THEREFROM FOR THE ELECTRODE PLATES OF BATTERIES

[75] Inventors: Christian Böhle, Soest; Eberhard Nann, Deiringsen, both of Fed. Rep. of Germany

[73] Assignee: Hagen Batterie AG, Soest, Fed. Rep. of Germany

[21] Appl. No.: 72,255

[22] Filed: Jun. 24, 1987

[30] Foreign Application Priority Data

Jul. 2, 1986 [DE] Fed. Rep. of Germany ....... 3622492

[51] Int. Cl.$^4$ ............................................... H01M 2/18
[52] U.S. Cl. .................................... 429/139; 429/147
[58] Field of Search ............... 429/139, 136, 131, 147, 429/185; 428/172, 192, 167, 128

[56] References Cited

U.S. PATENT DOCUMENTS

| 2,934,585 | 4/1960 | Zahn | 429/139 |
| 3,703,417 | 11/1972 | Rosa et al. | 429/139 |
| 4,003,758 | 1/1977 | Palmer et al. | 429/147 X |
| 4,215,186 | 7/1980 | Jaeger | 429/139 |
| 4,368,243 | 1/1983 | O'Rell et al. | 429/147 |
| 4,479,280 | 10/1984 | Yamazaki et al. | 428/192 X |
| 4,552,823 | 11/1985 | Wozniak | 429/139 X |
| 4,618,546 | 10/1986 | Simonton et al. | 429/139 X |
| 4,657,799 | 4/1987 | Nann et al. | 428/77 |

FOREIGN PATENT DOCUMENTS

| 3215659 | 4/1982 | Fed. Rep. of Germany . |
| 3207281 | 4/1982 | Fed. Rep. of Germany . |
| 3335547 | 4/1982 | Fed. Rep. of Germany . |

Primary Examiner—Anthony Skapars
Attorney, Agent, or Firm—Salter & Michaelson

[57] ABSTRACT

The invention concerns a sheet material and separator envelopes manufactured therefrom for enclosing electrode plates of batteries. The cited object is to improve the manufacturability of the heat-sealed or bonded seams of the electrode envelopes and to prevent puncturing or rupturing of the separator envelopes due to growth of the positive grid. This object is achieved by means of a base-sheet thickness for the sheet material used to manufacture the separator envelopes which is greater in the region of the marginal areas than in the region of the inner surface of the sheet material or separator envelopes.

6 Claims, 1 Drawing Sheet

SHEET MATERIAL AND SEPARATOR ENVELOPES MANUFACTURED THEREFROM FOR THE ELECTRODE PLATES OF BATTERIES

BACKGROUND AND SUMMARY OF THE INVENTION

The invention concerns a sheet material for the manufacture of separator envelopes to enclose the electrode plates of batteries, as well as separator envelopes manufactured from the sheet material.

In the series production of batteries, especially lead batteries, separator envelopes which are open at the top and closed on the remaining three sides are manufactured in such a way that the sheet material, which is somewhat wider than the electrode plates, is drawn from a roll and cut lengthwise, whereupon the sheet material is wrapped around the electrode plate and the contiguous marginal areas of the sheet material either are heat-sealed or are bonded, by ultrasound, for example.

The sheet material possesses a so-called base sheet consisting of a thin, porous, acid-resistant plastic foil with a PVC or polyethylene base. Such materials are described in German Laid-Open Patent Application No. 32 15 659, for example, or can be obtained from the firm W. R. Grace & Co. of Massachusetts under the tradename DARAMIC. Sheet materials with a base-material thickness that remains essentially the same over their entire width have been developed and are widely available commercially. In addition, separating means have been introduced into the region of the inner surface of the sheet material on the base sheet, or such means have been formed along with the base sheet, and are positioned opposite the positive electrode plate in the finished electrode envelope to keep the base sheet separate from the positive electrode plate. Such separating means are projecting parts or ribs, for example, and are described in German Laid-Open Patent Applications Nos. 32 07 281 and 32 15 659. Layers of fleece have also been used as separating means, as described in German Patent No. 33 35 547. Another existing method of obtaining these separating means is by deforming the base sheet, as illustrated by U.S. Pat. No. 4,003,758.

In all sheet materials, whether with or without separating means, the base sheet must be relatively thin and porous to give the separator envelopes high diffusivity. To achieve this purpose, the base sheet of existing sheet materials is only 0.20 to 0.25 mm thick, for example. If the aforesaid separating means are applied to or formed from the base sheet, then the total thickness of the sheet material increases to 1.0 to 1.5 mm, for example.

The aforesaid separating means are not ordinarily used on the side with the negative electrode plate, since the base sheet must lie as flatly as possible against the negative electrode plate. Consequently, existing sheet materials have, at the most, only a mini-ribbing on the negative electrode plate side; the height selected for this ribbing, however, is less than the thickness of the base sheet, a mounting to only 0.14 mm, for example.

In some embodiments of existing sheet materials there is also a mini-ribbing in the region of the marginal areas that are to be heat-sealed or bonded. During heat-sealing of the marginal areas of the sheet material this mini-ribbing serves to prevent undesirable side-slipping of the marginal areas lying one atop the other and the formation of undulations in the marginal areas. Here again, the height of this mini-ribbing in the region of the marginal areas is slight, and is much less than the thickness of the base sheet.

Enclosing the electrode plates of a battery in separator envelopes is intended to prevent short-circuits that can occur as a result of contact between the positive and negative plates or due to active substances that have precipitated or are present as residues. The electrode plates are wrapped as tightly as possible, since they are designed to be as large as possible within given cell dimensions for the battery in order to achieve high battery performance. The problem which then arises, however, is that during the life of the battery the positive grids of the electrode plates grow, i.e., become larger, as a result of corrosion processes, and the tight-fitting separator envelopes consequently can rupture at or near their margins or can be punctured, especially when a grid has sharp edges, consisting of expanded metal, for example. The battery goes dead prematurely as a result.

To alleviate the above problem to some extent, in determining the total width of the sheet material between the marginal areas and the inner surface congruent with the contact surface of the electrode plates, a transitional area of a few millimeters is usually provided, which, on the one hand, is used to render the heat-sealed or bonded seam more practicable during the manufacture of the separator envelopes, and, on the other, allows for a certain amount of growth of the positive grid of the electrode plates in the finished envelope.

These transitional areas cannot be extended arbitrarily with satisfactory results, however, since within given cell dimensions the electrode plates would become smaller and the performance of the battery would consequently decrease.

The object of the invention is to propose a sheet material and separator envelopes manufactured therefrom which ensure good practicability for the heat-sealed or bonded seams despite the use of the largest possible dimensions for the electrode plates within a given cell container and which offer strong protection against rupture or puncture of the separator envelopes caused by the growth of the grid of the positive electrode plates.

This object is achieved in that the base-sheet thickness of the sheet material is in the region of the boundary areas and consequently in the region of the heat-sealed or bonded seams of the separator envelopes is greater than in the region of the inner surface, which is made relatively thin to give the separator envelopes high diffusivity. In this connection, in a preferred embodiment of the invention the base-sheet thickness should increase constantly within the region of the transitional area, proceeding from the inner surface to the marginal areas. Abrupt transitions or any other type of transition are also feasible, however.

It is especially useful, for sheet materials with separating means in the region of the inner surface, to have the base-sheet thickness in the region of the boundary areas match the total thickness of the base sheet plus the separating means in the region of the inner surface. In this way the sheet material can be wound into a roll without any problems or distortion. If the base-sheet thickness selected for the sheet material in the region of the marginal areas is so great that roughly half the thickness of the electrode plate to be enclosed is overlapped by the marginal area, then any deformation of the sheet material in the region of the transitional area is lost.

Basically, the increased base-sheet thickness in the region of the marginal areas and the resultant build-up of material in the region of the heat-sealed or bonded seams have the advantage of eliminating the thermal problems that have occurred heretofore in very thin base sheets, especially with heat-sealing, and the disadvantages attendant thereon. It is much more difficult to achieve precise control of the thermal stress on the marginal areas of the sheet material in heat-sealing than it is in ultrasound bonding. If thermal overstressing occurs in a thin base sheet, then the material will rupture preferentially at this location due to the embrittlement of the material caused by the thermal overstress. However, the thickened marginal area according to the invention reduces the risk of thermal overstressing by improving the temperature distribution in the material, and any surface embrittlement of the material that may still occur will not cause the thickened marginal areas to rupture as easily as heretofore.

The build-up of material in the region of the marginal areas and preferably also in the transitional areas has the further advantages that with increased growth of the positive grid of the electrode plates the material cannot be punctured as easily, even by sharp grid edges, and moreover can be expanded to a greater extent than a material of slight base-sheet thickness, which will develop an extension crack even under relatively slight expansion. This advantage is especially significant with regard to PVC separator envelopes, since PVC has a lower specific expansibility than polyethylene separator envelopes [sic], for example.

The risk of overexpansion and rupture of the separator envelopes arises primarily in the region of the marginal areas and to some extent also in the region of the transitional areas. This risk is not present in the region of the inner surface of the material congruent with the contact surface of the electrode plates, since in the piled state the electrode plates are packed tightly together in the cell container, and the material of the separator envelopes thus is scarcely able to expand in this region.

As a result, the build-up of material according to the invention in the region of the marginal areas and also possibly in the region of the transitional areas, in combination with a base sheet that remains unformly thin, as heretofore, in the region of the inner surfaces of the material and the separator envelopes fabricated therefrom, enables these separator envelopes to be optimally adapted to the various requirements of their respective regions (marginal areas, transitional areas and inner surfaces).

DESCRIPTION OF THE DRAWINGS

Exemplary embodiments of the invention are described in more detail below with reference to the drawings, which are.

DESCRIPTION OF THE INVENTION

Figure 1:
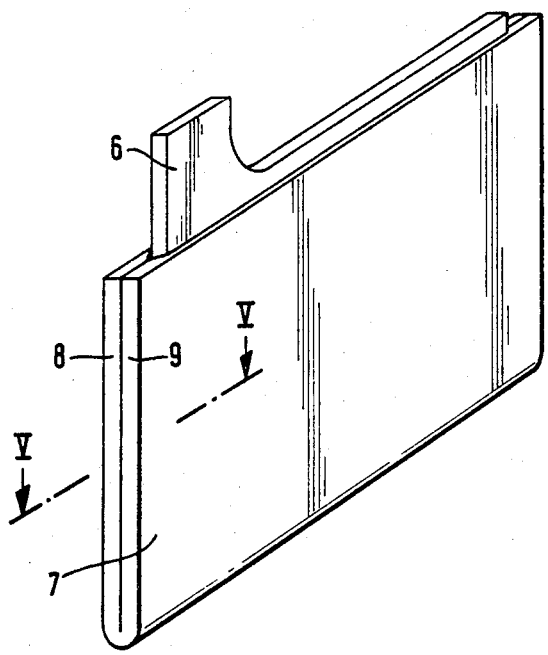
FIG. 1 A perspective view of a separator envelope according to the invention

FIG. 1 shows an electrode plate 6 of known design enclosed in a separator envelope 7 according to the invention. The separator envelope consists of two layers 8 and 9 of the sheet material according to the invention, which is wrapped around the bottom edge of the electrode plate 6 and is then heat-sealed or bonded along its contiguous marginal areas.

Figure 2:
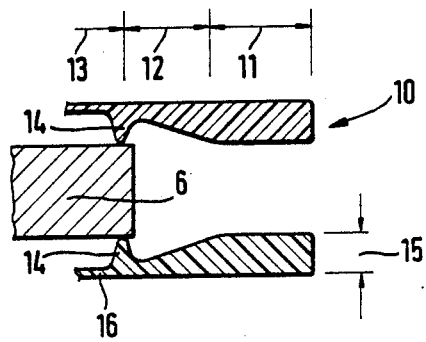
FIGS. 2-4 Cross sections through various embodiments of the invention along line V—V of FIG. 1.

FIG. 2 is a cross section along line V—V of FIG. 1 through the schematically represented electrode plate 6 and a sheet material 10 whose marginal areas 11 have not yet been heat-sealed or bonded together, as would be necessary in order to fabricate the separator envelope.

Shown in FIG. 2 are a marginal area 11, a transitional area 12 and the inner surface 13 of the sheet material 10. The transitional area 12 extends from the marginal area 11 to the outermost separating rib 14 of the sheet material, which forms the boundary of the contact surface of the electrode plate 6 and at which the inner surface 13 of the sheet material congruent with the contact surface of the electrode plate begins.

According to the invention, the base-sheet thickness of the sheet material 10 is greater in the region of the marginal areas 11 than in the region of the inner surface 13. In the region of the transitional area 12 the base-sheet thickness increases constantly from the inner surface 13 to the marginal area 11.

FIG. 2 also shows the preferred embodiment of the sheet material 10 according to the invention, in which the base-sheet thickness 15 in the region of the marginal areas 11 matches the total thickness of the base sheet 16 plus the separating ribs 14 in the region of the inner surface 13. In this way the sheet material can be wound into a roll without any problems or distortion.

Figure 3:
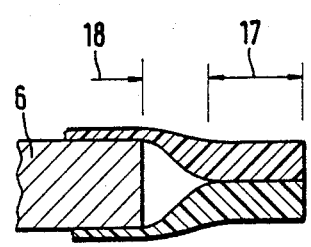
Figure 4:
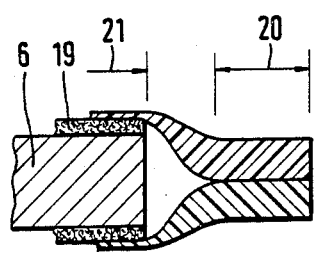

FIGS. 3 and 4 show comparable cross sections through finished separator envelopes, in which the marginal areas of the sheet material have already been heat-sealed or bonded together.

FIG. 3 gives the simplest form of a sheet material according to the invention, which is fabricated without separating means and in which the base-sheet thickness of the sheet material is visibly greater in the region of the marginal areas 17 than in the region of the inner surface 18.

FIG. 2 shows an exemplary embodiment involving a sheet material that has as separating means a layer of fleece 19 that completely covers the contact surface of the electrode plate 6. Here again, the base-sheet thickness of the sheet material is greater in the region of the outer marginal areas 20 than in the region of the inner surface 21.

What is claimed is:

1. A jacketed positive battery plate for a lead-acid battery comprising a positive electrode plate having opposite side faces, opposite side edges and an end edge, and a separator jacket on said electrode plate, said jacket being made from an elongated flexible foldable sheet including a pair of elongated longitudinally extending marginal edge portions and an elongated longitudinally extending central portion therebetween, the width of said central portion being approximately the same as the width of said plate, the thickness of said sheet being substantially greater in said marginal edge portions than in said central portion, said sheet being folded over the end edge of said electrode plate so that said marginal edge portions are overlayed on themselves, said marginal edge portions being sealed to themselves adjacent the side edges of said plate.

2. The jacketed battery plate of claim 1 further comprising separating means maintaining said jacket in outwardly spaced relation to said side faces.

3. In the jacketed battery plate of claim 2, the thickness of said sheet in said marginal edge portions being approximately equal to the thickness of said sheet in said central portion plus the thickness of said separating means.

4. In the jacketed battery plate of claim 2, said separating means comprising integrally formed separating ribs on said central portion of said sheet, said ribs engaging the opposite side faces of said electrode plate adjacent the side edges thereof.

5. In the jacketed battery plate of claim 3, said separating means comprising integrally formed separating ribs on said central portion of said sheet, said ribs engaging the opposite side faces of said electrode plate adjacent the side edges thereof.

6. In the jacketed battery plate of claim 2, said separating means comprising layers of fleece.

* * * * *